United States Patent
Fabiilli

(10) Patent No.: US 8,262,156 B2
(45) Date of Patent: Sep. 11, 2012

(54) WIRE HARNESS GUIDE AND PROTECTOR

(75) Inventor: Marta Ann Fabiilli, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 30 days.

(21) Appl. No.: 12/870,973

(22) Filed: Aug. 30, 2010

(65) Prior Publication Data

US 2012/0049583 A1    Mar. 1, 2012

(51) Int. Cl.
*B60J 7/00* (2006.01)

(52) U.S. Cl. ........................................ 296/208; 296/210

(58) Field of Classification Search .................. 296/214, 296/216.08, 1.07, 1.08, 97.9, 210, 155, 208; 24/297, 453, 458; 174/4 CC, 70 R, 72 A, 174/535
See application file for complete search history.

(56) References Cited

U.S. PATENT DOCUMENTS

| | | | |
|---|---|---|---|
| 4,640,184 A | 2/1987 | Matsushima et al. | |
| 5,269,060 A * | 12/1993 | Dowd et al. | 29/897.2 |
| 5,309,634 A * | 5/1994 | Van Order et al. | 29/863 |
| 5,739,475 A | 4/1998 | Fujisawa et al. | |
| 5,856,635 A | 1/1999 | Fujisawa et al. | |
| 5,887,939 A * | 3/1999 | Yamaguchi et al. | 296/210 |
| 2002/0195844 A1* | 12/2002 | Hipwell | 296/214 |
| 2004/0007380 A1* | 1/2004 | Gajewski | 174/72 A |
| 2004/0222673 A1* | 11/2004 | Brown | 296/214 |
| 2009/0115226 A1 | 5/2009 | Shallcross et al. | |
| 2009/0152905 A1 | 6/2009 | Arellano et al. | |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

A wire harness guide for accurate placement of a wire harness onto a component and protection of the wire harness from rubbing against a surface in near proximity thereof is provided. The wire harness guide can include an elongated bracket having a channel portion extending along a length of the bracket, the channel portion located between an upper flange and a lower flange. The upper flange can extend along at least a portion of the elongated bracket, as can the lower flange. A side wall can extend between the upper flange and the lower flange and a bend extending transversely across the elongated bracket can be present.

14 Claims, 3 Drawing Sheets

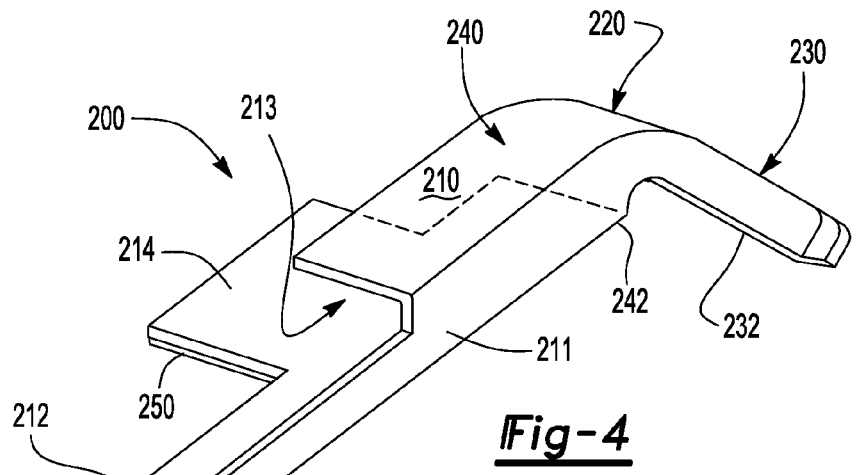
_Fig-4_
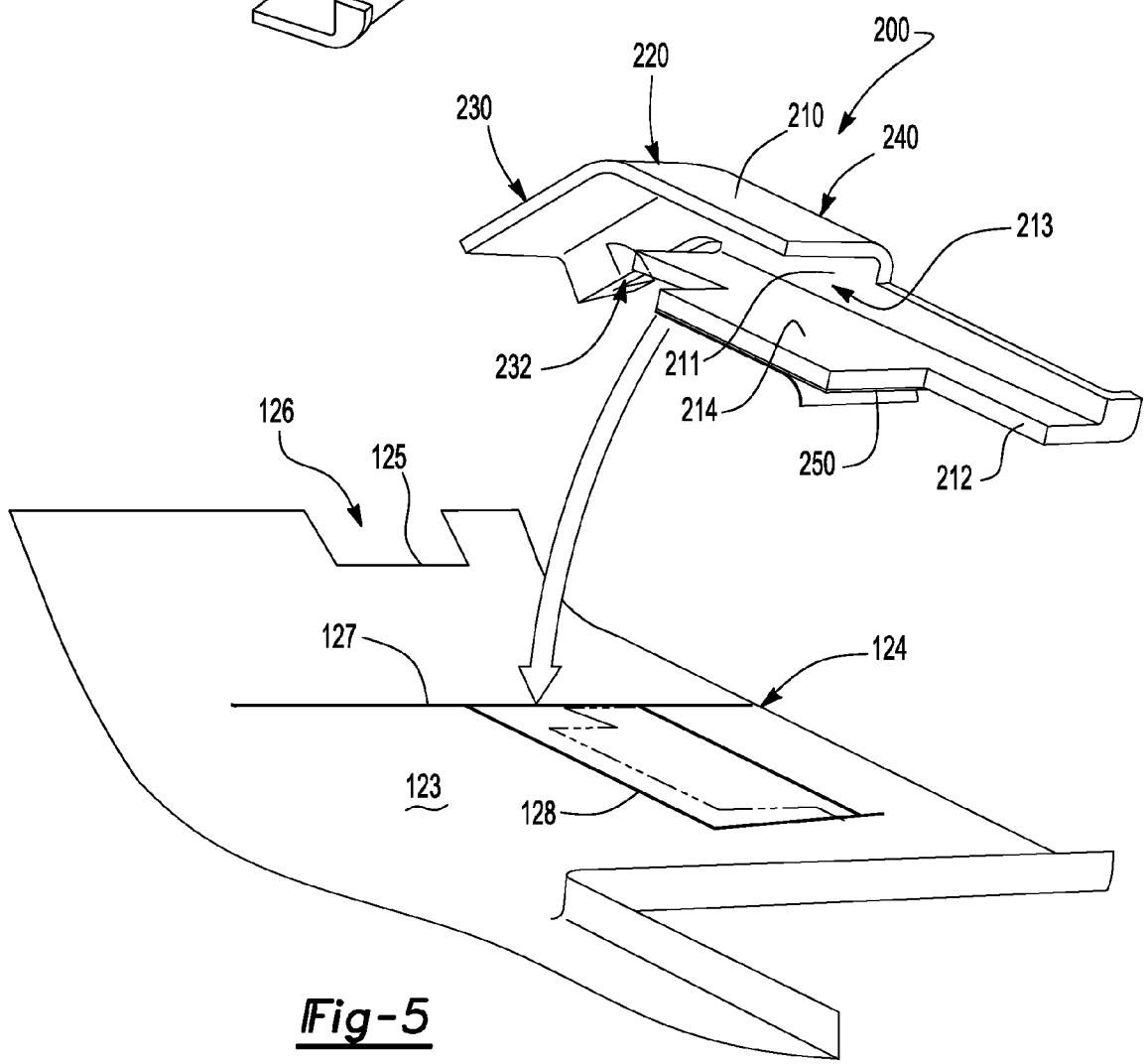
_Fig-5_

US 8,262,156 B2

WIRE HARNESS GUIDE AND PROTECTOR

FIELD OF THE INVENTION

The present invention relates to a wire harness guide and protector, and in particular a wire harness guide and protector for accurate placement of a wire harness onto a component and protection of the wire harness from rubbing against any component in a near proximity thereof.

BACKGROUND OF THE INVENTION

The use of wire harnesses to afford electronic communication between various components and a power source within complex machinery, motor vehicles, farm equipment, etc., is common. In some instances, a wire harness is attached at one end to an electronic component, passes behind a panel that hides the wire harness from view, and has another end that is attached to another component and/or a power source. In such instances, the wire harness is desirably routed from one end to the other end in such a manner that it does not interfere with other components, other wire harnesses, latches, brackets, and the like. In addition, protection of the wire harness from rubbing against other surfaces is desirable.

During the manufacture of complex machinery, motor vehicles, etc., the proper and/or accurate placement of the wire harness relative to an electronic component, a panel, etc. can be a critical step for proper and reliable assembly. For example, the proper and/or accurate positioning of the wire harness relative to a panel that hides the harness from view can provide a desired and proper amount of extension of the harness from the panel such that an end of the harness can be attached to an electrical component with relative ease and yet not have an excess amount of the harness exposed between the component and the panel.

Heretofore processes and/or devices for attaching a wire harness to a panel include the use of adhesives such as tape, glue, and the like. In addition, devices such as zip ties, brackets, hook-and-loop fasteners, etc., have been used to attach wire harnesses to panels. However, with each of the heretofore processes and/or devices, proper and accurate placement of the wire harness to the panel has been imprecise, required tooling, complicated steps, and the like. Therefore, a wire harness guide and/or protector that affords for proper and accurate placement of a wire harness to a panel such that a reduced tolerance for the distance that an end of the wire harness extends from the panel would be desirable.

SUMMARY OF THE INVENTION

A wire harness guide for accurate placement of a wire harness onto a component and protection of the wire harness from rubbing against a component in a near proximity thereof is provided. The wire harness guide can include an elongated bracket having a channel portion extending along a portion of the bracket, the channel portion located between an upper flange and a lower flange. The upper flange can extend along at least a portion of the elongated bracket, as can the lower flange. A side wall can extend between the upper flange and the lower flange.

A bend extending transversely across the elongated bracket can be included. The bend in the elongated bracket can afford for abutment of the bracket against an edge portion of a component and thereby locate the bracket at a predefined and desired location on the component. The channel portion can be dimensioned for the wire harness to fit therewithin. As such, the wire harness can be attached to the elongated bracket with an end of the wire harness extending from the bracket a predefined and desired distance, with the bracket attached to the component at a desired location and the wire harness extending from the component a predefined and desired distance.

The elongated bracket can have an attachment tab extending from the lower flange, the attachment tab having adhesive on a lower surface thereof. The adhesive can be used to attach the attachment tab of the elongated bracket to the component and thus attach the wire harness to the component. In operation, the wire harness is desirably attached to the elongated bracket and fits at least partially within the channel portion. The elongated bracket is attached to the component in a quick and simple manner by abutting the bend portion of the bracket against the edge portion of the component and pressing the attachment surface with the adhesive onto the component.

In some instances, the wire harness can have an interference fit within the channel portion and may or may not use adhesive to attach the wire harness to the elongated bracket. It is appreciated that the wire harness can be used to electrically connect an electronic device to a power source as is known to those skilled in the art. For example and for illustrative purposes only, the electronic component can be an electronic compass, an electronic temperature indicator, etc. that is located within a rear view mirror attached to a windshield. The wire harness can be attached to the electronic device and pass above a panel in the form of a headliner and extend to a separate electronic device, power source, etc.

With the wire harness located at least partially within the channel portion of the elongated bracket, the upper flange extends over the wire harness and can protect the harness from a hard, rough and/or abrasive surface in near proximity thereto. For example and for illustrative purposes only, the upper flange can protect the wire harness from rubbing against a bracket, panel, etc. that is spaced apart and oppositely disposed from the component that the wire harness is attached to. The wire harness guide can be made from any material known to those skilled in the art, illustratively including metals, alloys, plastics, ceramics, wood, and the like.

BRIEF DESCRIPTION OF THE DRAWINGS

FIG. 4 is a perspective view of the wire harness guide shown in FIG. 3;
FIG. 5 is a perspective view illustrating placement of the wire harness guide shown in FIG. 4 onto a panel.

DETAILED DESCRIPTION OF THE INVENTION

The present invention discloses a wire harness guide that affords for quick, reliable, and accurate placement of a wire harness to a component such as a panel. Therefore, the present invention has utility as a component for a motor vehicle.

The wire harness guide can include an elongated bracket having a channel portion into which a wire harness fits at least partially therewithin. The dimensions of the channel portion can afford for an interference fit of the wire harness therewithin and/or the use of an adhesive can provide for attachment of the wire harness to the wire harness guide and vice versa. In some instances, the wire harness can have at least one end that extends from the elongated bracket a desired and predefined distance.

The elongated bracket can also have a bend region that extends transversely across the bracket such that the bracket has a first elongated portion and a second elongated portion in the shape of a hockey stick. The bend portion of the elongated bracket allows for abutment of the bracket against an edge portion of a panel and thereby affords for accurate placement of the wire harness guide onto the panel and thus a reduced tolerance for a distance or length the wire harness extends beyond the panel.

In some instances, the panel can be at least a portion of a headliner for a motor vehicle and the wire harness can have an end that attaches to a rear view mirror which itself is attached to a windshield of the vehicle. Within the rear view mirror can be an electronic device such as an electronic compass, an electronic temperature indicator, and the like. It is appreciated that a gap and/or short distance can be present between the headliner and the rear view mirror and thus require the wire harness to extend beyond or out from the headliner. As such, with the wire harness attached to the wire harness guide at a desired location, and the bend of the wire harness guide ensuring proper and accurate placement of the guide relative to the headliner, an improved tolerance for the extension of the wire harness from the headliner to the rear view minor is provided.

Figure 1:
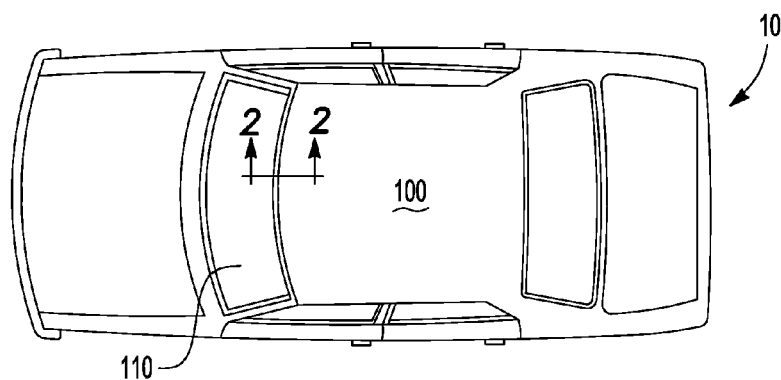
FIG. 1 is a top view of a motor vehicle.

Turning now to FIG. 1, a top view of a motor vehicle is shown generally at reference numeral 10. The motor vehicle 10 can have a roof 100 and a windshield 110.

Figure 2:
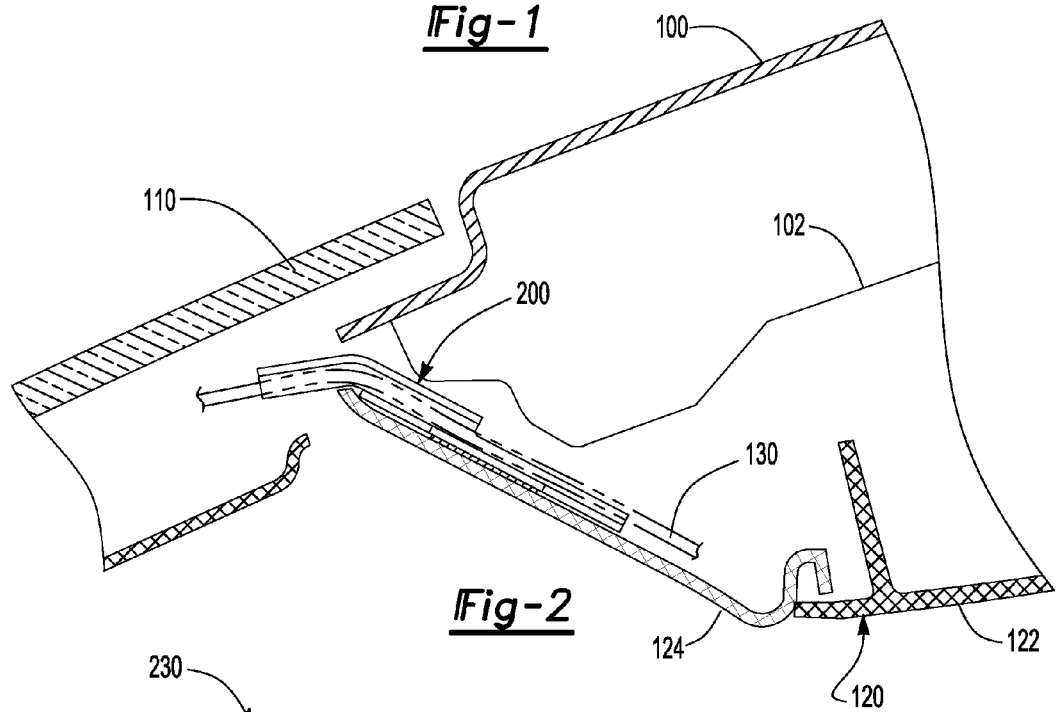
FIG. 2 is a side cross-sectional view of the section 2-2 shown in FIG. 1.

FIG. 2 provides a side cross-sectional view of section 2-2 shown in FIG. 1 and thus provides a side view of the roof 100 and the windshield 110. In addition to the roof 100 and the windshield 110, the roof can have a reinforcement bracket 102 and the vehicle 10 can have a headliner 124 that is attached to the roof 100 as is known to those skilled in the art. A wire harness 130 can be present between the roof 100 and the headliner 124, the headliner 124 hiding the wire harness 130 from view by an occupant of the motor vehicle. The wire harness 130 can extend from the headliner 124 and for example have an end attached to a rear view minor (not shown) attached to the windshield 110. A wire harness guide 200 can also be provided, the wire harness 130 passing at least partially through the guide 200 and being protected from contacting and/or rubbing against the roof reinforcement bracket 102 which is in near proximity to the harness 130. In some instances, an overhead console 120 having a bottom surface 122 can also be present and be in contact with the headliner 124.

Figure 3:
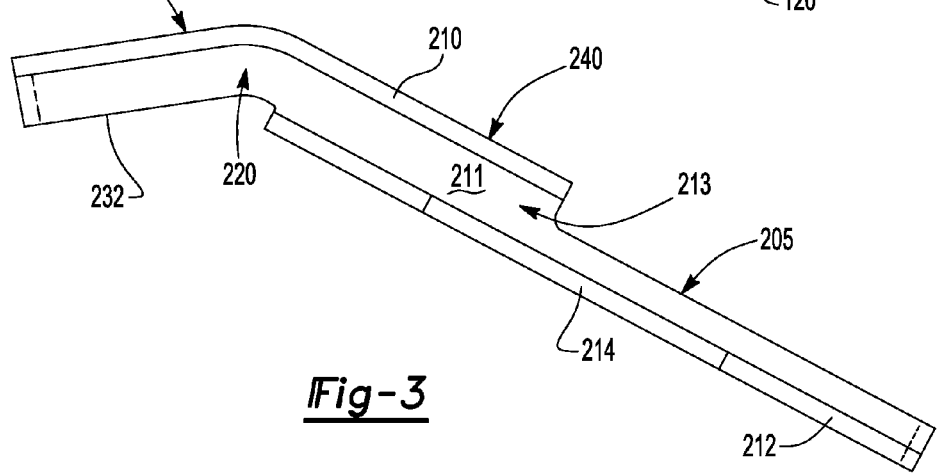
FIG. 3 is a side view of a wire harness guide according to an embodiment of the present invention.

Referring now to FIGS. 3 and 4, a side view and a perspective view, respectively, of the wire harness guide 200 are shown. The wire harness guide 200 can be in the form of an elongated bracket 205 which has a top flange 210 and a bottom flange 212, both of which extend along at least a portion of the elongated bracket 205. It is appreciated that the top flange 210 can be spaced apart from the bottom flange 212 and have a side wall 211 extending therebetween. In a region or portion where the top flange 210 overlaps the bottom flange 212, a channel portion 213 is provided. In some instances, the channel portion 213 can be a generally U-shaped channel portion.

The elongated bracket 205 can have a bend or bend region 220 that is located transversely across the bracket 205 and separates a first elongated portion 230 having a bottom surface 232 and a second elongated portion 240 having a bottom surface 242. It is appreciated that the first elongated portion 230 and the second elongated portion 240 can provide a hockey stick shape when viewed from the side as shown in FIG. 3.

Turning now to FIG. 5, a perspective view of the wire harness guide 200 and the headliner 124 is shown. The headliner 124 can have a planar portion 123 and an edge portion 125 that may or may not be in a slot region 126. As indicated by the arrow in the figure, the wire harness guide 200 can be placed into contact with the headliner 124. In some instances, the bottom surface 232 can come into contact with and/or abut against the edge portion 125 when the wire harness guide 200 is placed in contact with the headliner 124. An adhesive 250, for example and for illustrative purposes only, double-sided tape, can be present on a bottom surface of the attachment tab 214 and afford for attachment of the wire harness guide 200 to the headliner 124.

Figure 6:
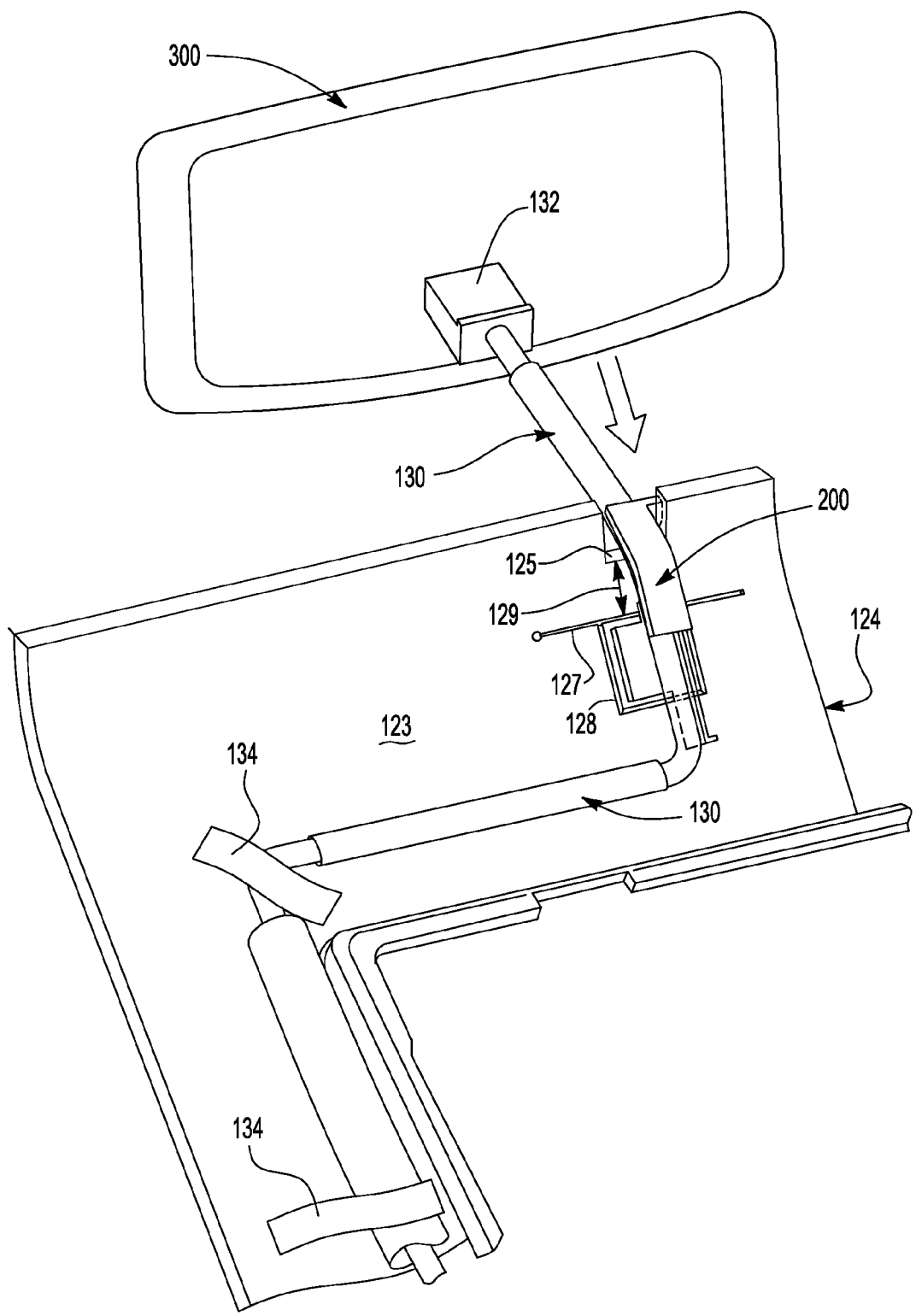
FIG. 6 is a top perspective view of a wire harness attached to the wire harness guide and the wire harness guide attached to a panel.

Referring to FIG. 6, installation or assembly of the wire harness 130 to the headliner 124 is illustrated. The wire harness 130 can be attached to the wire harness guide 200 with the harness 130 at least partially within the channel portion 213 (shown in FIG. 5). In some instances, the wire harness 130 can be preassembled and attached to the wire harness guide 200 before being brought into contact with the headliner 124.

During assembly, the wire harness 130 attached to the wire harness guide 200 is brought into proximity of the headliner 124 and the bottom surface 232 is brought into contact with the edge region 126 while the attachment tab 214 is pressed against the planar portion 123. With the bend 220 being at a desired and generally precise location along the elongated bracket 205, the bottom surface 232 in combination with the attachment tab 214 being pressed against the planar portion 123, the wire harness guide 200 is located at a proper and accurate location relative to the headliner 124.

In some instances, the headliner 124 can have a first line indicator 127 and/or a second line indicator 128 that can further assist an individual in aligning the attachment tab 214 during attachment of the wire harness guide 200 to the headliner 124. For example and for illustrative purposes only, the wire harness guide 200 can be dimensioned such that the attachment tab 214 should not extend beyond the first indicator line 127 towards the edge region or edge portion 125 and/or should be centered as viewed in the figure, of the second indicator line 128. Stated differently, a distance 129 between the edge portion 125 and the indicator line 127 ensures that if the attachment tab 214 of the wire harness guide 200 is placed beyond or below the line 127 and within the second indicator line 128 as shown in FIG. 6, then the guide 200 is properly located relative to the headliner 124. In this manner, the slot region 126 aids in physical placement and the first and second indicator lines 128, 129 aid in visual placement of the protector along the width of the vehicle.

It is appreciated that after the wire harness guide 200 is attached to the headliner 124, that additional adhesive 134 can be used to attach the wire harness 130 at different locations on the headliner 124. For example and for illustrative purposes only, the additional adhesive 134 can be tape, hot glue, etc. In addition, the wire harness 130 can extend beyond the headliner 124 and have an end 132 that is located a predefined and desired distance therefrom.

Also shown in FIG. 6, the end 132 can be attached to a rear view minor 300, the rear view mirror attached to the motor vehicle, for example to the windshield 110 as known to those skilled in the art. In this manner, the headliner 124 can be installed within the vehicle 10 with the wire harness 130 extending from the headliner 124 a predefined distance plus or minus a small tolerance.

After the headliner 124 is installed, the end 132 can then be attached to the rear view mirror 300 without 'too little' or 'too much' slack in the wire harness portion that extends from the headliner 124 to the mirror 300. As such, the wire harness guide 200 provides improved tolerance for the placement of the wire harness 130 relative to the headliner 124 in a simple and accurate manner.

The invention is not restricted to the illustrative examples described above. The examples are not intended as limitations on the scope of the invention. Methods, processes, apparatus, compositions, and the like described herein are exemplary and not intended as limitations on the scope of the invention. Changes therein and other uses will occur to those skilled in the art. The scope of the invention is defined by the scope of the claims.

I claim:

1. A wire harness guide assembly for accurate placement of a wire harness onto a headliner and protection of said wire harness from rubbing against any components in a near proximity, said wire harness guide comprising:
   a headliner having a planar portion and an edge portion;
   an elongated bracket having a channel portion extending along a length of said bracket, said channel portion located between an upper flange extending along at least a portion of said bracket, a lower flange extending along at least a portion of said bracket and a side wall extending between said upper flange and said lower flange;
   a bend extending transversely across said elongated bracket such that said elongated bracket has a hockey stick shape when viewed from the side, said bend operable to abut against said edge portion of said headliner and locate said bracket at a predefined location on said headliner;
   said channel portion dimensioned for the wire harness to fit therewithin and be protected from rubbing against a surface in near proximity to said channel portion.

2. The wire harness guide assembly of claim 1, wherein said elongated bracket has an attachment tab extending from said lower flange, said attachment tab adjacent to and attached to said planar portion of said headliner.

3. The wire harness guide assembly of claim 2, wherein said attachment tab has a lower surface with an adhesive, said adhesive attaching said attachment tab to said headliner.

4. The wire harness guide assembly of claim 1, further comprising a wire harness having an end, said wire harness located at least partially within said channel portion of said elongated bracket with said wire harness end extending from said headliner a predefined distance.

5. The wire harness guide assembly of claim 4, wherein said wire harness has an interference fit within said channel portion.

6. The wire harness guide assembly of claim 5, further comprising a motor vehicle rear view mirror attached to a motor vehicle front windshield, said wire harness end attached to said rear view mirror.

7. The wire harness guide assembly of claim 1, wherein said upper flange covers said wire harness and prevents a surface in near proximity to said wire harness from coming into contact therewith.

8. The wire harness guide assembly of claim 7, further comprising a roof reinforcement bracket in close proximity to said wire harness, said upper flange preventing said wire harness from coming into contact with said roof reinforcement bracket.

9. A rear view mirror and headliner assembly comprising:
   a rear view mirror attached to a windshield;
   a wire harness having an end;
   an elongated bracket having a generally U-shaped channel portion with said wire harness located at least partially within said U-shaped channel portion and said wire harness end extending from said elongated bracket a predefined distance;
   a headliner having a planar portion and an edge portion, said elongated bracket and said wire harness attached thereto, said wire harness end extending from said headliner a predefined distance and attached to said rear view mirror;
   said elongated bracket having a bend region extending transversely across said bracket such that said elongated bracket has a hockey stick shape when viewed from the side, said bend region having a bottom surface abutting said edge portion of said headliner and locating said elongated bracket at a predefined location thereon.

10. The assembly of claim 9, wherein said elongated bracket has an attachment tab extending from said U-shaped channel portion, said attachment tab adjacent to and attached to said planar portion of said headliner.

11. The assembly of claim 10, wherein said attachment tab has a lower surface with an adhesive, said adhesive attaching said attachment tab to said planar portion of said headliner.

12. The assembly of claim 9, wherein said wire harness has an interference fit within said U-shaped channel portion.

13. A process for accurately attaching a wire harness to a headliner and protecting the wire harness from a surface that can be abrasive and is in close proximity thereto when the headliner is attached to a motor vehicle, the process comprising:
   providing a wire harness having an end, a headliner and an elongated bracket, the elongated bracket having a channel portion, a bend such that the elongated bracket has a hockey stick shape when viewed from the side and an attachment surface with an adhesive, the wire harness located at least partially within the channel portion of the elongated bracket;
   attaching the elongated bracket with the wire harness attached thereto to the headliner by abutting the bend against an edge portion of the headliner and placing the adhesive on the attachment surface into contact with the headliner;
   attaching the headliner with the elongated bracket and wire harness attached thereto to a motor vehicle, the wire harness in close proximity to an abrasive surface of the motor vehicle.

14. The process of claim 13, wherein the abrasive surface is a roof reinforcement bracket.

* * * * *

UNITED STATES PATENT AND TRADEMARK OFFICE
CERTIFICATE OF CORRECTION

| | | |
|---|---|---|
| PATENT NO. | : 8,262,156 B2 | Page 1 of 1 |
| APPLICATION NO. | : 12/870973 | |
| DATED | : September 11, 2012 | |
| INVENTOR(S) | : Marta Ann Fabiilli | |

It is certified that error appears in the above-identified patent and that said Letters Patent is hereby corrected as shown below:

In the Specification

At column 3, line number 27, Delete "minor", Insert --mirror--.

At column 3, line number 42, Delete "minor", Insert --mirror--.

At column 4, line number 43, Delete "minor", Insert --mirror--.

At column 4, line number 62, Delete "minor", Insert --mirror--.

At column 5, line number 2, Delete "minor", Insert --mirror--.

At column 5, line number 4, Delete "minor", Insert --mirror--.

Signed and Sealed this
Seventeenth Day of June, 2014

Michelle K. Lee
*Deputy Director of the United States Patent and Trademark Office*